Patented Nov. 28, 1939

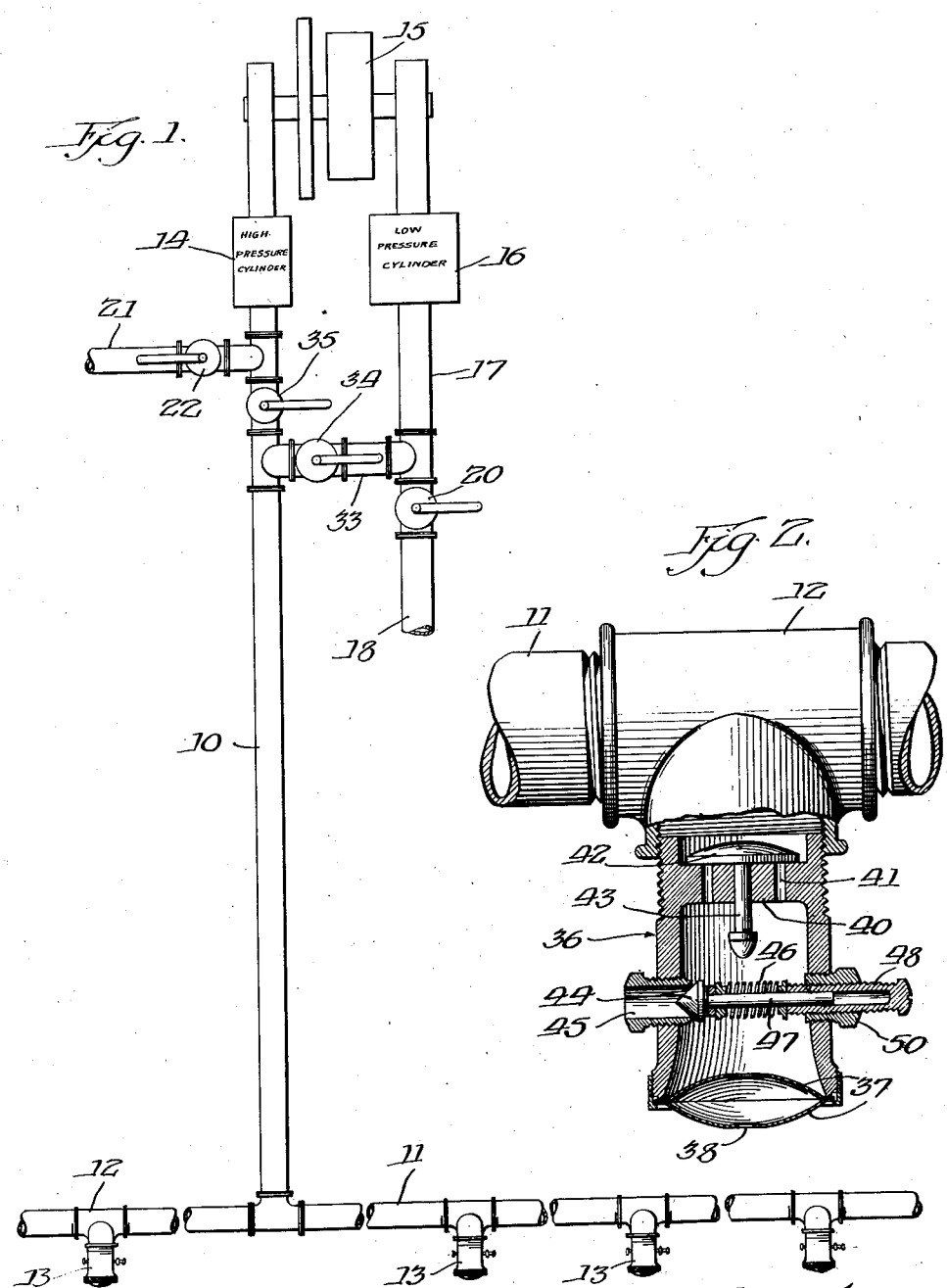

2,181,336

UNITED STATES PATENT OFFICE 2,181,336

UNDERGROUND ALARM SYSTEM

William A. McCurdy and Fred Wedlake,
Virginia, Minn.

Application November 8, 1937, Serial No. 173,519

5 Claims. (Cl. 116—70)

The invention relates to signal systems and has particular reference to an underground alarm system used in mines to warn the workmen of danger.

Heretofore a gas such as ethylene mercaptan has been used as an alarm to warn workmen in underground mines and the like of danger and said gas has also been used as a signal for having the men come to the surface for other reasons. However, the use of gas has proved unsatisfactory since in the first place the odor remains in the mine and a signal can not be repeated the same day. Secondly, the gas had a disagreeable effect on the men and accordingly the method was not tested very often. Also since the gas was discharged throughout the mine by the compressed air piping system those working places not using compressed air did not receive the signal until an appreciable time after it was given.

The present method is a decided improvement on the use of gas as a signalling medium since the alarm is received by the men within a few seconds after it is given and no disagreeable effects are possible. Most mines and underground working places are supplied with compressed air for operating the working tools and the like. The present alarm system makes use of the same by placing whistles on the compressed air line at places from which a signal is to be given. The whistles are operated by a vacuum in the line, however, with provision being made for preventing the escape of air under normal conditions, that is, when the line carries compressed air.

With these and various other objects in view the invention may consist of certain novel features of construction and operation as will be more fully described and particularly pointed out in the specification, drawing and claims appended hereto.

In the drawing which illustrates an embodiment of the invention and wherein like reference characters are used to designate like parts—

Figure 1 is a diagrammatic view showing in elevation piping having whistles connected thereto and also illustrating the valve arrangement for changing the pressure in the piping system from above atmospheric to below atmospheric; and Figure 2 is an elevational view, parts being shown in section, of the vacuum whistle embodying the features of the invention.

Referring to the drawing, particularly Figure 1, the numeral 10 indicates a compressed air main leading from a source of supply to a mine or similar underground working place, at which point the compressed air main is provided with one or more branch pipes 11. The pipes 10 and 11 may be considered as comprising the usual compressed air piping system generally found in mines and the like by which compressed air is provided for operating the working tools and other machinery in the mine.

The branch pipe 11 which extends to the working places within the mine is provided at intervals with connections 12 which include a vacuum whistle indicated in its entirety by the numeral 13 and more particularly shown in Figure 2. The other end of the compressed air main 10 has connection with a high pressure cylinder 14 forming part of the compressor indicated generally by numeral 15. The other part of the compressor consists of the low pressure cylinder 16 which has connection with the piping 17, the end 18 of which extends to the atmosphere, there being interposed between 17 and 18 the valve 20. The compressed air main 10 adjacent its connection with the high pressure cylinder 14 also has a connection 21 which leads to the atmosphere, the same being provided with the valve 22.

The by-pass 33 joins the low pressure main 17 with the compressed air main 10 and in order to make it possible to connect the main 10 with the low pressure cylinder or the high pressure cylinder, as desired, the by-pass is provided with a valve 34 and another valve 35 is located above the by-pass between the same and the atmospheric connection 21. When the piping system is to carry air at a pressure above atmospheric pressure valve 22 leading to the atmosphere is closed, valve 35 is open, and valve 34 is closed. The low pressure cylinder is therefore cut off by closing valve 34 and the main 10 has direct connection with the high pressure cylinder. In the event it is desired to produce a sub-atmospheric pressure in the main 10 in order to signal the men in the mine by the vacuum whistle of the invention, it is first necessary to open valve 22 leading to the atmosphere and close valve 35. The by-pass valve 34 is then opened and valve 20 is closed so that the low pressure cylinder is directly connected with the main 10.

Referring more particularly to Figure 2, the connection 12 has suitably threaded thereto the cylindrical member 36 which is provided at its lower end with the whistle means comprising the opposed convex discs 37, each having a center opening 38. The partition 40, located in the upper part of the member, has passages 41 formed therein which are normally closed by valve 42. The upper surface of the partition forms a valve seat for said valve and the movement of the valve toward and from said seat is guided by the downwardly directed valve stem 43, which fits within a center opening formed in the partition. When the main 10 and the branch piping 11 is carrying compressed air the valve 42 will be forced against its seat so that the passages 41 are held closed. Therefore under normal operating conditions provision is made for preventing leakage of air from the system. When it is desired to signal the workmen a sub-atmospheric pressure is produced in the piping by connecting the same to the low pressure cylinder as described. Immediately upon establishing such connection the valve 42 in each whistle having connection with the branch piping will be lifted from its seat and air will be drawn through the center openings 38 in the discs 37. A clear sound of moderate pitch will be produced which can be used as an alarm to warn the workmen of danger. By proper designing of the several parts of the whistle the signal will be heard by the men in the mine even though some distance removed from the location of the whistle. This method of signalling has several important advantages since no disagreeable effects are produced, and repeat signals can be given or the system can be again operated within a few minutes of the first alarm.

For regulating the air pressure entering the whistles each member 36 is provided with a spring-energized valved opening consisting of the cone-shaped valve 44, the tubular member 45 providing the valve seat, and the coil spring 46. The valve stem is guided by the tubular guide 48. The guide 48 has threaded connection with member 36 through the nipple 50 and by rotation of said tubular guide its location can be varied so as to regulate the tension exerted by the coil spring 46 tending to maintain the opening closed. When the main valve 42 is lifted as a result of sub-atmospheric pressure within the branch piping air will be drawn through the center openings of the whistle members and the valve 44 will also be retracted, permitting air to enter through the tubular member 45. By proper adjustment of the pressure exerted by the coil spring 46 the degree of opening movement of the valve 44 can be regulated so that the air pressure entering the whistles will be just sufficient to produce a sharp and clear sound.

The invention is not to be limited to or by details of construction of the particular embodiment thereof illustrated by the drawing, as various other forms of the device will of course be apparent to those skilled in the art without departing from the spirit of the invention or the scope of the claims.

What is claimed is:

1. In a whistle, a body member adapted to have connection to an air line whereby the interior of said member will be in communication with said line, means located at the end of the member opposite said connection for producing a sound by the passage of air therethrough, a partition within said member between the sound producing means and said line, passages extending through said partition, and a valve for closing said passages when the pressure in the air line is above atmospheric, said valve having operation when a sub-atmospheric pressure exists in the line to open said passages establishing communication between the air line and the sound producing means, whereby a sound is produced by the passage of air through said means.

2. In a signal system for mines and the like, the combination with an air line normally connecting with a source of air under pressure, of audible signal producing means also connecting with said line, valve means located between said signal producing means and the air line, said valve means being maintained in closed position as long as the pressure within the line is above atmospheric, but being lifted from its closed position only by atmospheric pressure when a vacuum exists in the line to cause said signal producing means to produce an audible signal, a source of sub-atmospheric pressure for connection to said line to create a vacuum therein, and means for connecting said last mentioned source to the air line when the source of air under pressure is disconnected therefrom.

3. In a signal system for mines and the like, the combination with an air pipe line normally connecting with a source of air under pressure, of audible signal producing means also connecting with said pipe line, a valve interposed between said signal producing means and the line, said valve being closed to prevent the escape of air from the line as long as the pressure is above atmospheric, but being lifted from its closed position only by atmospheric pressure when a vacuum exists in the line to allow air to be drawn through said signal producing means whereby an audible signal is produced, a source of sub-atmospheric pressure for connection to said line to create a vacuum therein, and means for connecting said last mentioned source to the pipe line when the source of air under pressure is disconnected therefrom.

4. In a signal system for underground mines and the like, the combination with a pipe line normally connecting with a source of air under pressure, audible signal producing members fixed to and communicating with said line at intervals throughout its length, valve means for closing communication between the signal producing members and the pipe line, each valve means being constructed and arranged to close so as to prevent the escape of air from said pipe line as long as the pressure within the line is above atmospheric, but being lifted from its closed position only by atmospheric pressure when a vacuum exists within the line to cause said signal producing members to produce an audible signal, a source of sub-atmospheric pressure for connection to said line to create a vacuum therein, and means for connecting said last mentioned source to the pipe line when the source of air under pressure is disconnected therefrom.

5. Apparatus for warning workmen in underground mines and the like of existing danger, comprising in combination, a pipe line extending into said mine, means for supplying said line with air under pressure or for producing a sub-atmospheric pressure in said line as desired, a plurality of signal producing members fixed to said pipe line at spaced intervals and having communication therewith, and a valve interposed between each signal producing member and the line for closing communication between said member and the line as long as air under pressure exists in said line, each valve being lifted from its closed position only by atmospheric pressure to establish communication between its signal producing member and the line when a sub-atmospheric pressure exists therein, whereby air will be drawn through said signal producing member to cause an audible signal.

WILLIAM A. McCURDY.
FRED WEDLAKE.